(12) United States Patent
Sims et al.

(10) Patent No.: US 8,154,953 B1
(45) Date of Patent: Apr. 10, 2012

(54) REMOTE CONTROLLED FISH LOCATING SYSTEM

(76) Inventors: Henry F. Sims, Athens, AL (US); Rex P. Cooper, Athens, AL (US)

( * ) Notice: Subject to any disclaimer, the term of this patent is extended or adjusted under 35 U.S.C. 154(b) by 124 days.

(21) Appl. No.: 12/697,746

(22) Filed: Feb. 1, 2010

(51) Int. Cl.
*G01S 15/96* (2006.01)
*A01K 97/00* (2006.01)

(52) U.S. Cl. ............ 367/96; 367/107; 367/908; 43/26.1

(58) Field of Classification Search .......... 367/107–114, 367/910; 43/26.1
See application file for complete search history.

(56) References Cited

U.S. PATENT DOCUMENTS

| | | | |
|---|---|---|---|
| 4,644,512 A * | 2/1987 | Grilk ............................ | 367/111 |
| 4,757,481 A * | 7/1988 | Orr et al. ........................ | 367/96 |
| 4,926,399 A | 5/1990 | Hickman | |
| 5,154,016 A * | 10/1992 | Fedora et al. .................. | 43/26.1 |
| 5,201,884 A * | 4/1993 | Nicholas ........................ | 43/26.1 |
| 6,122,852 A | 9/2000 | Mechling, IV | |
| 6,474,922 B2 * | 11/2002 | Bachman et al. ............... | 414/21 |
| 6,661,742 B2 | 12/2003 | Hansen | |
| 6,760,995 B2 * | 7/2004 | Mueller ........................ | 43/26.2 |
| 6,771,562 B2 | 8/2004 | Betts et al. | |
| 6,791,902 B1 | 9/2004 | Steiner et al. | |
| 7,161,872 B2 | 1/2007 | Kuriyama et al. | |
| 7,322,872 B2 * | 1/2008 | Butler et al. ..................... | 446/57 |
| 7,554,884 B2 * | 6/2009 | Park ............................. | 367/107 |

* cited by examiner

*Primary Examiner* — Ian Lobo
(74) *Attorney, Agent, or Firm* — Montgomery Patent & Design, LLC; Robert C. Montgomery; Joseph T. Yaksich

(57) ABSTRACT

A fish locating system combines the functionality of a remote controlled miniature electric boat with an underwater sonar system. The watercraft is provided with a sonar transponder attached to an exterior deck. The sonar transponder wirelessly transmits sonar readings including bottom depth and terrain, schools of fish, underwater obstructions, water temperature, and the like, to the watercraft's wireless remote controller's display screen. The remote controller comprises a display screen that visually depicts the sonar scan in real-time. In use, a person can be on shore or on an anchored boat while performing underwater reconnaissance.

5 Claims, 7 Drawing Sheets

REMOTE CONTROLLED FISH LOCATING SYSTEM

RELATED APPLICATIONS

The present invention was first described in and claims the benefit of U.S. Provisional Application No. 61/206,269, filed Jan. 30, 2009, the entire disclosures of which are incorporated herein by reference.

FIELD OF THE INVENTION

The present invention relates generally to sonar devices used to locate fish and other physical objects in underwater settings, and in particular, to a remote controlled fish finder with a wirelessly controllable sonar device.

BACKGROUND OF THE INVENTION

The technology used by anglers to catch fish has become increasingly complex in nature. A broad range of products have hit the market which are designed to aid the fisherman in catching fish more quickly than is possible with the traditional hook-and-worm approach. In particular, sonar-based fish finding devices have become popular as a reliable and informational method of locating schools of fish, detecting water depth, and sensing underwater obstructions.

One problem associated with common sonar based fish finding system is that they only scan a small portion of a surrounding area from a given configuration. When the sonar is mounted to the boat, the user must jockey the entire boat back and forth in order to map an entire underwater area. This wastes both time and fuel and limits the functionality of the sonar to a very particular area of usage. Such arrangements also prevent on-shore users from utilizing the technology.

Various attempts have been made to provide sonar based fish finding systems which provide broader and more efficient scanning capabilities. Examples of these attempts can be seen by reference to several U.S. patents. U.S. Pat. No. 4,926,399, issued in the name of Hickman, describes a transducer mounting system. The Hickman device is a bracket which allows a sonar-based fishing system to be mounted to a boat in a rotatable manner.

U.S. Pat. No. 6,661,742, issued in the name of Hansen, describes a trolling motor with a sonar transducer. The Hansen apparatus provides a trolling motor sonar attachment which allows for the repositioning of the boat and sonar in a more efficient manner.

U.S. Pat. No. 6,791,902, issued in the name of Steiner et al., describes a portable fish finder. The Steiner apparatus provides a sonar device which is attached to a control module by means of a deployable cable to allow a user to manipulate the sonar portion while underwater.

While these apparatuses fulfill their respective, particular objectives, each of these references suffer from one (1) or more of the aforementioned disadvantages. Many such apparatuses still require great expenditures of time, effort, or fuel in order to operate at maximum potential. Also, many such apparatuses require time and effort in order to retrofit to an existing boat or the like, and as such are also not readily usable in a variety of situations. Furthermore, many such apparatuses do not provide additional facilities and data which may be useful in the determination of likely fish locations, such as water temperature. Accordingly, there exists a need for a sonar-based fish finding system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an apparatus. Thus, the object of the present invention is to solve the aforementioned disadvantages and provide for this need.

To achieve the above objectives, it is an object of the present invention to comprise a radio-controlled fish locating system capable of searching for solid objects and underwater terrain as well as receiving information on water temperature. The system comprises a watercraft, a controller, and a sonar buoy.

Another object of the present invention is to comprise a controller of an electric circuit which further comprises a controller battery, a controller power switch, menu control buttons, a pair of joysticks, a controller antenna, and a display screen. The controller provides a user with selectable functionality including steering for the watercraft via the joysticks.

Yet still another object of the present invention is to provide electrical current to the controller power switch and menu control buttons via the controller battery. The menu control buttons allow a user to manipulate the display screen in order to read desired information including underwater topography, location of solid objects with the water, water temperature, and the like.

Yet still another object of the present invention is to comprise a pair of hulls, a deck, a plurality of motors, a plurality of propellers, and corresponding propeller covers. An RF signal provided by the controller determines the speed of each of the motors and propellers in order to direct the watercraft in a desired manner. An RF signal provided by the watercraft relays data receiving from the sonar buoy to the controller for display.

Yet still another object of the present invention is to further comprise a threaded deck aperture on an underside of the deck of the watercraft. The sonar buoy is removably attachable to the aperture.

Yet still another object of the present invention is to further comprise a watercraft electric circuit which comprises a watercraft battery, a watercraft power switch, and a watercraft antenna which receives the RF signals from the controller.

Yet still another object of the present invention is to comprise a sonar buoy of a conventional sonar based fish finding system which includes capabilities for determining the location of solid objects underwater, depth and terrain mapping, water temperature, and the like.

Yet still another object of the present invention is to provide a method of utilizing the device that provides a unique means of attaching the sonar buoy to the watercraft, placing the watercraft in the vicinity of a desired area of water, utilizing the controller to steer and position the watercraft in a desired, transmitting data collected by the sonar and watercraft, and displaying the data in a usable manner on the controller.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
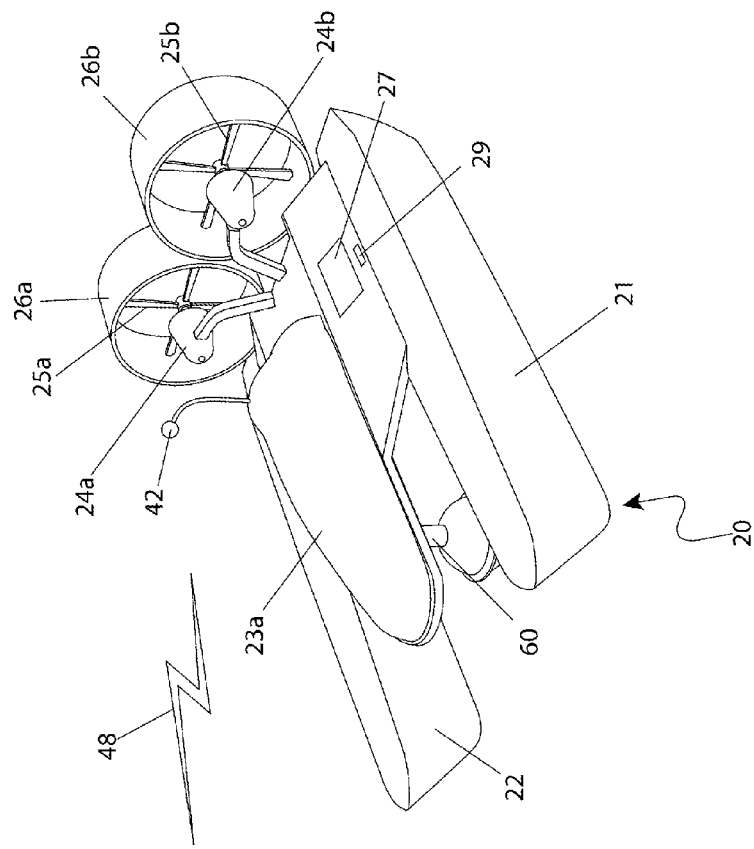
FIG. 1 is a perspective view of a radio-controlled fish locating system 10, according to a preferred embodiment of the present invention.
Figure 1:
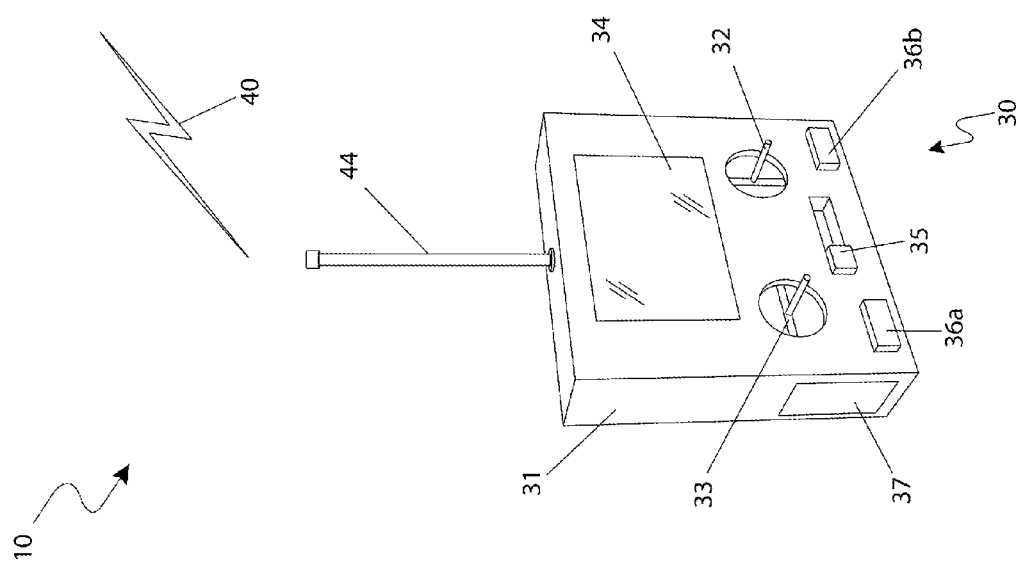

DESCRIPTIVE KEY 10 radio-controlled fish locating system
20 watercraft
21 first hull
22 second hull
23a deck
23b deck aperture
24a first motor
24b second motor
25a first propeller
25b second propeller
26a first propeller cover
26b second propeller cover
27 watercraft battery cover
28 watercraft battery
29 watercraft power switch
30 controller
31 housing
32 first joystick
33 second joystick
34 display screen
35 controller power switch
36a first menu control button
36b second menu control button
37 controller battery cover
38 controller battery
39 controller control module
40 first RF signal
42 watercraft antenna
44 controller antenna
46 watercraft control module
48 second RF signal
60 sonar buoy
61 sonar threading
62 sonar control module
65 sonar signal
70 electrical wiring

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a radio-controlled fish locating system (herein described as the "system") 10, which provides a means for combining a remote controlled watercraft 20 with an underwater sonar system, thereby enabling a user to wirelessly search under the surface of a body of water for any solid object and receive information on the water's temperature, depth, and the terrain of the bottom of said body of water. An image will then be displayed graphically to a user thereon a controller 30. The system 10 generally comprises a watercraft 20, the controller 30, and a sonar buoy 60. The system 10 enables a user, such as a fisherman, to remain on shore or on a boat while coincidentally performing an underwater search.

Referring now to FIG. 1, a perspective view of the system 10, according to the preferred embodiment of the present invention, is disclosed. The system 10 comprises a controller 30, thereby enabling the user to control the location of the watercraft 20 and to view underwater terrain and aquatic creatures. The controller 30 preferably comprises expected features similar to other common radio-controlled (RC) toy transmitters such as, but not limited to a first joystick 32, a second joystick 33, a controller power switch 35, and a controller antenna 44. The system 10 also comprises a watercraft 20, thereby providing a means to detect underwater features such as terrain and aquatic creatures in a desired location. The watercraft 20 is to be placed therein a desired body of water and works in conjunction with the controller 30. The watercraft 20 comprises expected features similar to other common RC toy watercraft such as, but not limited to a first hull 21, a second hull 22, a deck 23, one or more batteries 28, a plurality of motors 24, and a plurality of propellers 25.

Figure 2:
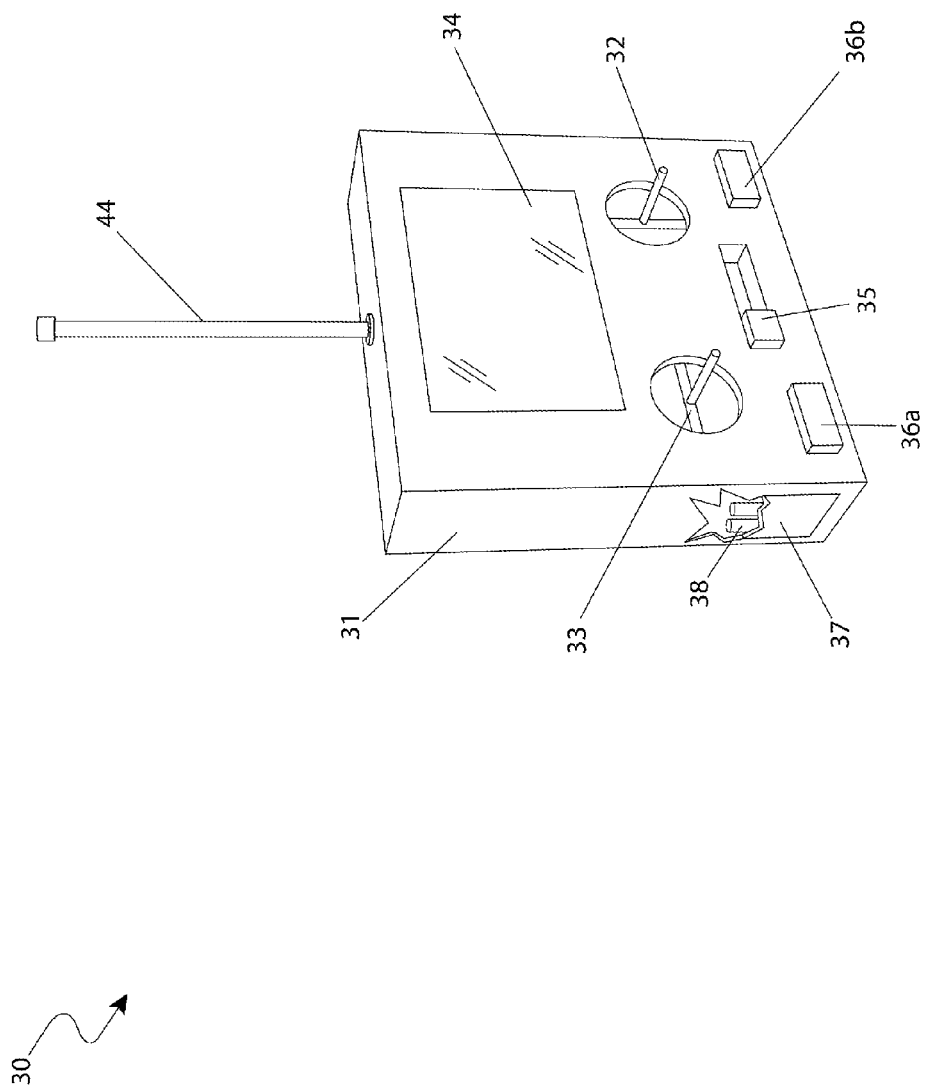
FIG. 2 is a perspective view of a controller 30, according to a preferred embodiment of the present invention.

Referring now to FIG. 2, a perspective view of the controller 30, according to the preferred embodiment of the present invention, is disclosed. The controller 30 comprises an outer housing 31 which is preferably made of a rigid thermoplastic material and is fabricated through common injection molding techniques. The controller 30 is multifunctional and provides a means of controlling the operation of the watercraft 20. The controller 30 transmits a first RF signal 40 (see FIG. 1) with the assistance of the controller antenna 44 and provides a means of communication and control thereto the watercraft 20 via said first RF signal 40. The watercraft 20 receives and processes the first RF signal 40 from the controller 30 and translates it into electrical signals that are sent to an internal watercraft control module 46 (see FIG. 7).

The forward-backward movement of the watercraft 20 is controlled via an up-down manipulation of the first joystick 32 and the side-to-side motion of said watercraft 20 is controlled via a left-right manipulation of the second joystick 33. Each joystick 32, 33 are comprised of conventional potentiometers, yet other electrical means may be utilized without limiting the functions of the system 10. The controller 30 further comprises a controller power switch 35 located on a top surface of said controller 30, thereby providing a means to turn on and off an internal controller control module 39 (see FIG. 7). Although the controller power switch 35 is illustrated as a single pull single throw on-off switch it is understood that the controller 30 may be introduced with a variety of switches, such as a push switch or the like and as such should not be viewed as a limiting factor of the system 10.

One (1) or more controller batteries 38 provide a power supply thereto the controller 30 and are comprised of common disposable or rechargeable electrochemical cells and are located therein a side portion of the body of said controller 30. A controller battery cover 37 provides a means of housing and protection for said controller batteries 38 and removably attaches thereto the housing 31 of the controller 30.

The controller 30 further comprises a display screen 34 located on a front surface thereof. The display screen 34 preferably comprises a graphical display device such as a liquid crystal display (LCD) or the like which displays information received from the sonar buoy 60 (see FIG. 3). The display screen 34 graphically represents the underwater terrain and aquatic creatures such as located by the sonar buoy 60. The controller 30 yet further comprises a first menu control button 36a and a second menu control button 36b, thereby providing an incrementing and decrementing means to the controller 30 in a conventional manner. The control buttons 36a, 36b enable the user to skip through various menus incorporated within the controller 30. Each control button 36a, 36b is preferably a pushbutton, yet other electrical switching devices may be utilized without limiting the functions of the system 10.

Figure 3:
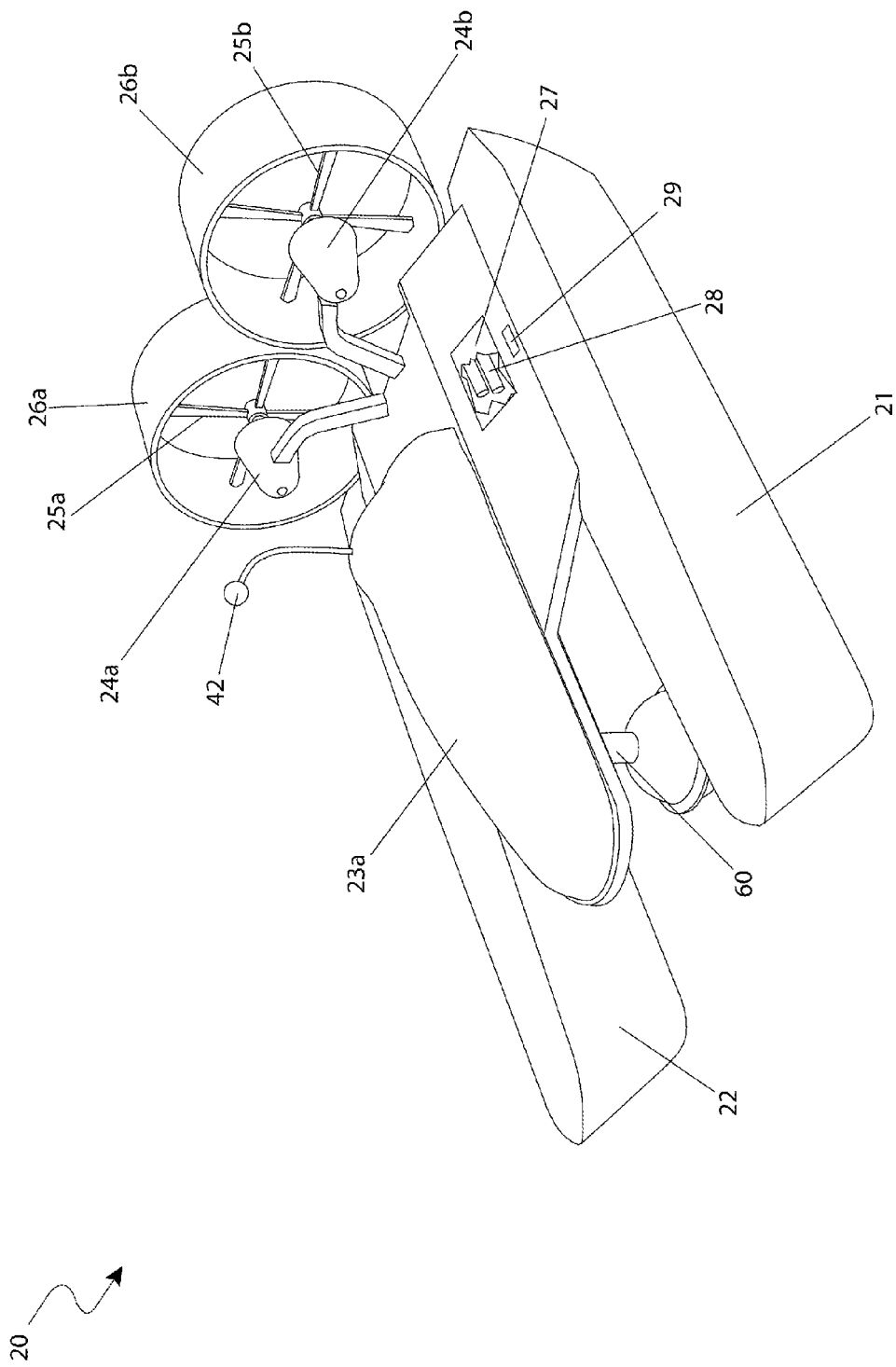
FIG. 3 is a side perspective view of a watercraft 20, according to a preferred embodiment of the present invention.
Figure 4:
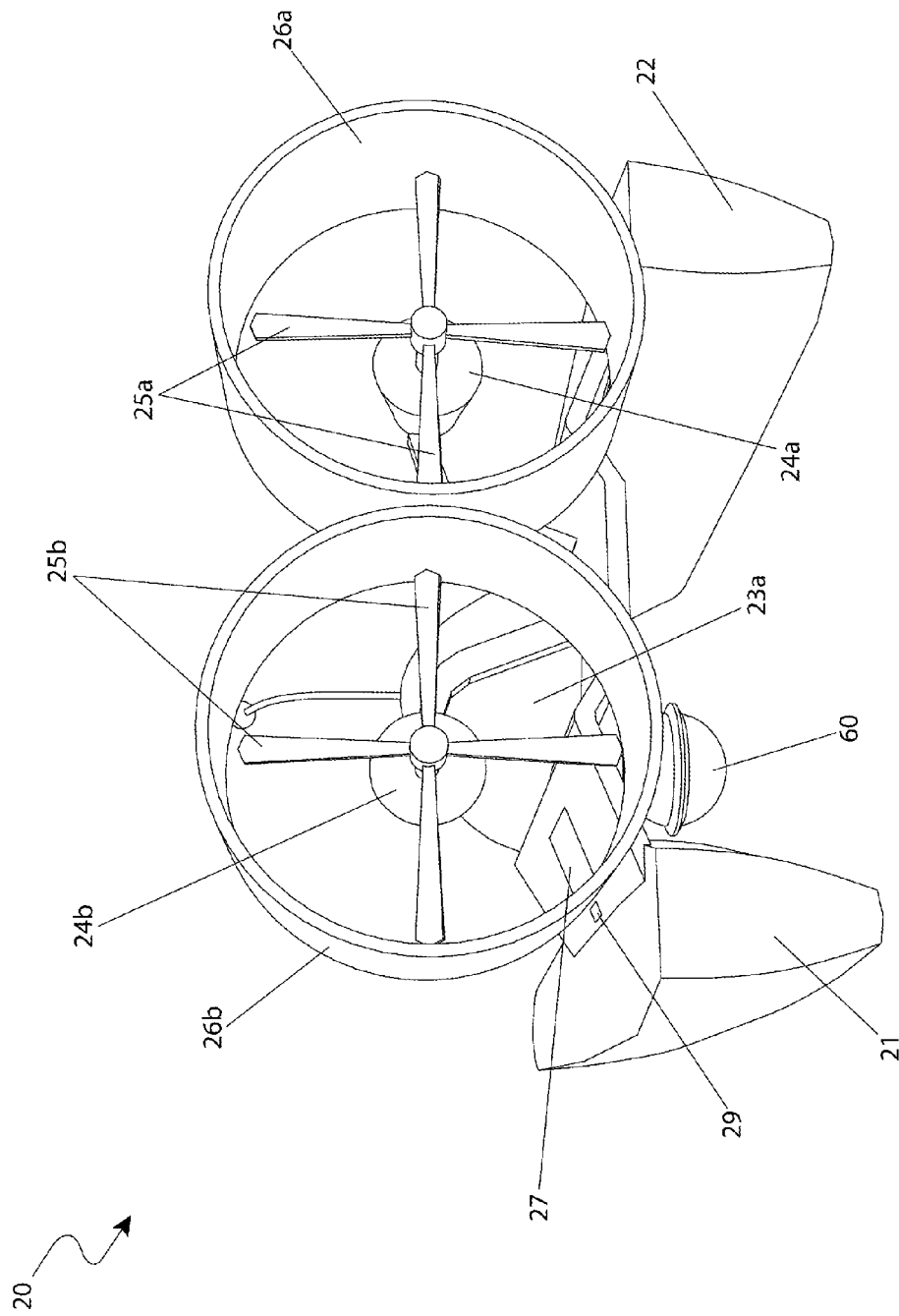
FIG. 4 is a rear perspective view of the watercraft 20, according to a preferred embodiment of the present invention.
Figure 5:
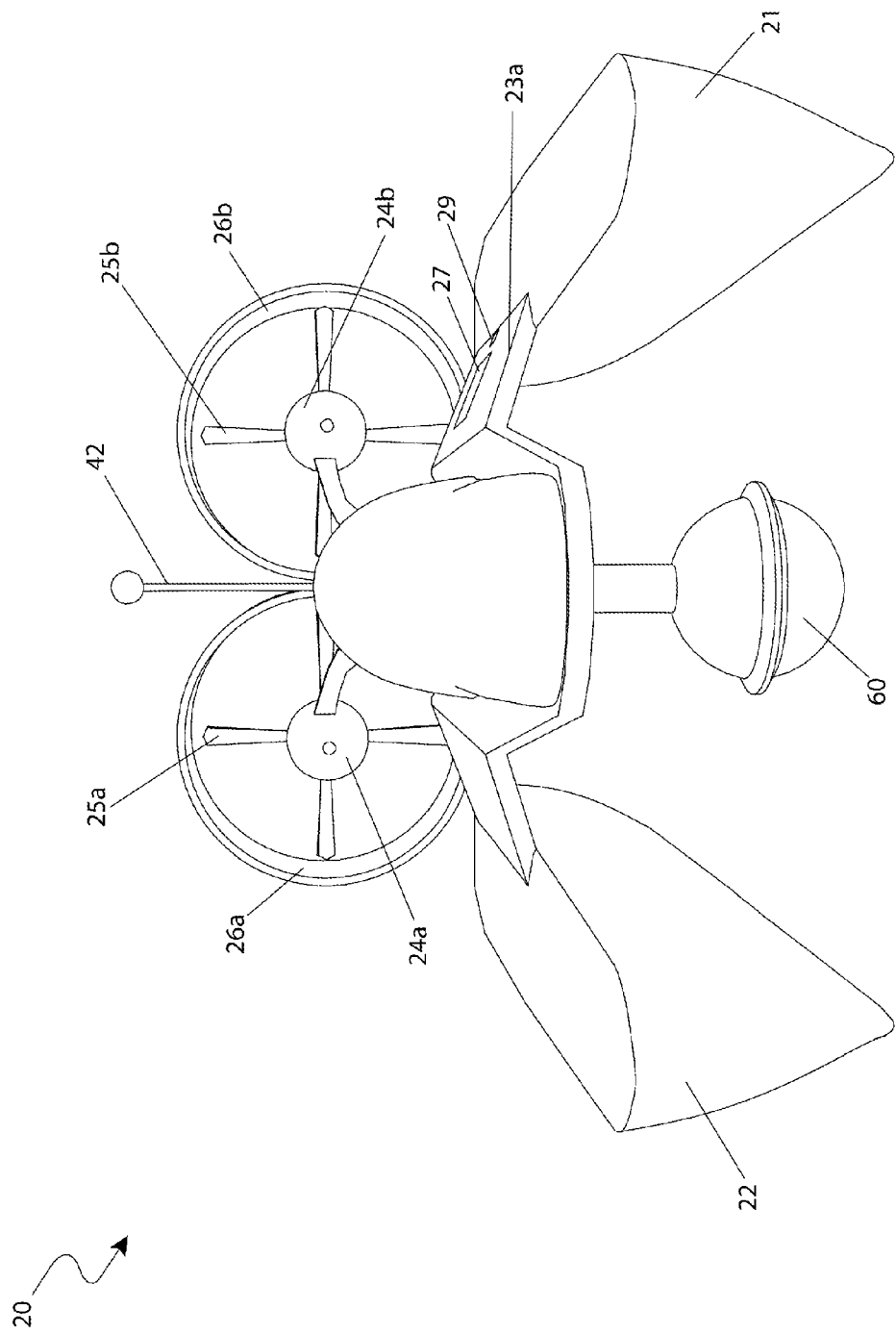
FIG. 5 is a front perspective view of the watercraft 20, according to a preferred embodiment of the present invention.

Referring now to FIG. 3 through FIG. 5, various views of the watercraft 20, according to the preferred embodiment of the present invention, are disclosed. FIG. 3 depicts a side perspective view of the watercraft 20, FIG. 4 depicts a rear perspective view of the watercraft 20, and FIG. 5 depicts a front perspective view of the watercraft 20. The watercraft 20 comprises a first hull 21 and a second hull 22 as abovementioned. The first hull 21 and the second hull 22 comprise the body of the watercraft 20 and provide a means of buoyancy thereto said watercraft 20. The hulls 21, 22 are connected thereto one another via the deck 23 in a parallel orientation. Although illustrated here comprising a plurality of hulls 21, 22 similar to a commercially available boat, the watercraft 20 may be introduced with various hull 21, 22 and deck 23 configurations and as such should not be interpreted as a limiting factor of the system 10. The watercraft 20 is preferably made of a buoyant thermoplastic material and is fabricated through a common injection molding process comprising various colors, patterns, or indicia.

The watercraft 20 is driven via a pair of motors 24a, 24b, a pair of attached propellers 25a, 25b, and is powered via removably attached batteries 28. The motors 24a, 24b are preferably comprised of a common brushless direct-current electric motor typical to RC toy watercraft and each shaft of the motors 24a, 24b are attached to a respective propeller 25a, 25b axis thereon a rear upper portion of the watercraft 20. Although illustrated as attached thereto the rear end of the watercraft 20 it is understood that the motor 24a, 24b or a plurality of motors 24a, 24b may be attached at various locations thereon said watercraft 20 having equal benefit and as such should not be interpreted as a limitation of the present system 10. The propellers 25a, 25b provide a force when in motion to direct the watercraft 20 in a desired location as determined via manipulation of the controller 30. The propellers 25 are enclosed therewithin a respective circular propeller cover 26a, 26b, thereby providing a means of protecting said propellers 25a, 25b and directing the airflow thereof.

The watercraft batteries 28 are located thereon an upper surface of the watercraft 20 and are preferably comprised of common disposable or rechargeable electrochemical cells and are located therein an upper surface of the watercraft 20. A watercraft battery cover 27 provides a means of housing and protection therefrom the outside elements and removably attaches thereto the upper surface of the watercraft 20.

The watercraft 20 further comprises a watercraft power switch 29 located on an outside surface of said watercraft 20 adjacent to the watercraft battery cover 27, thereby providing a means to turn on and off an internal electric circuit. Although the watercraft power switch 29 is illustrated as a single-pull single-throw on-off switch it is understood that the watercraft 20 may be introduced with a variety of switches, such as a push switch or the like and as such should not be viewed as a limiting factor of the system 10.

The watercraft 20 also comprises a watercraft antenna 42 comprising a common RC transducer which receives a first RF signal 40 for a typical internal radio wave receiver. The antenna 42 also transmits a second RF signal 48 to the controller 30, thereby providing said controller 30 with data acquired from a sonar signal 65 (see FIG. 7). The antenna 42 is preferably locating thereon an intermediate upper surface of the watercraft 20, yet other locations may be utilized without limiting the functions of the system 10.

Figure 6:
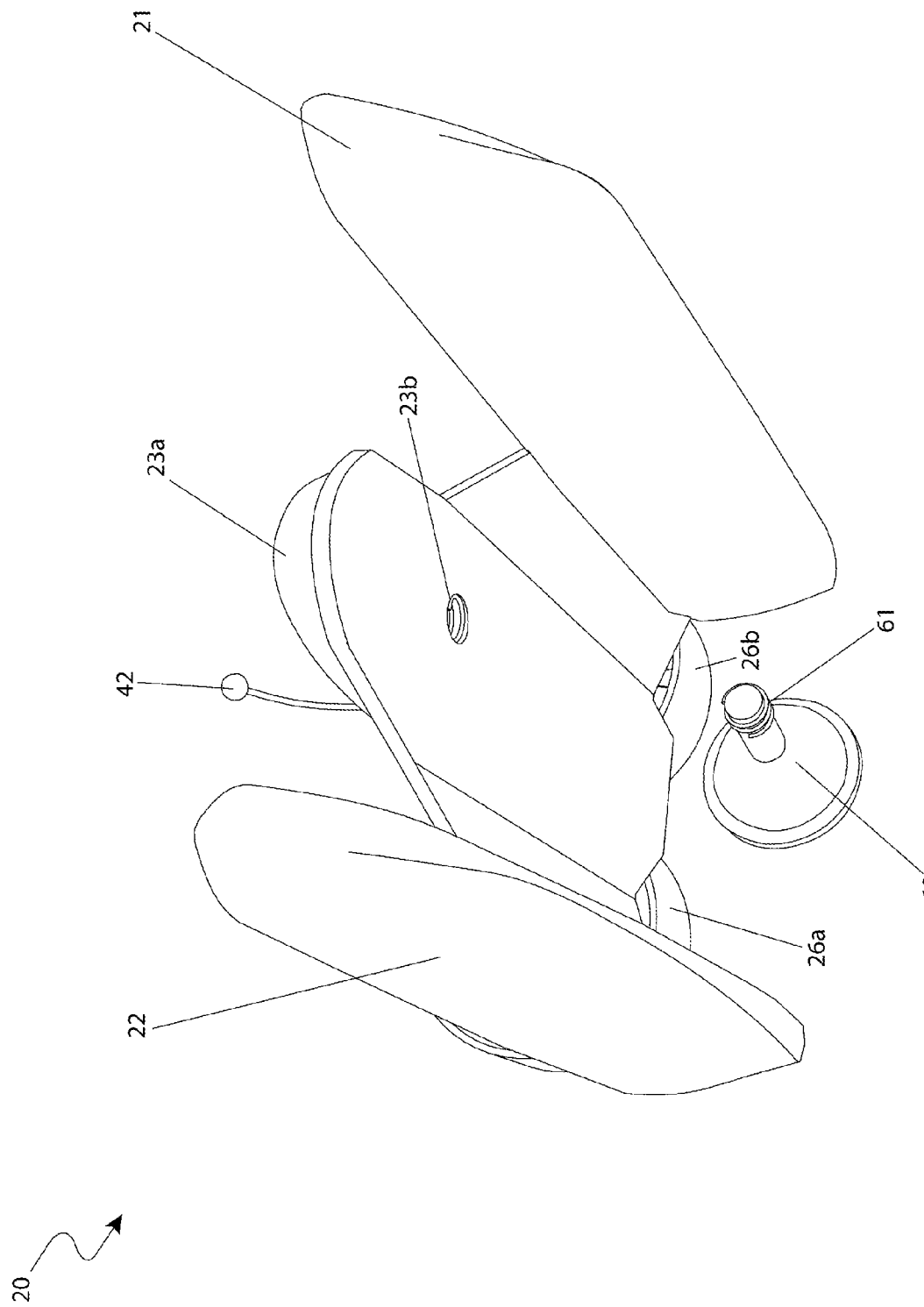
FIG. 6 is a bottom perspective view of the watercraft 20 depicting attachment of a sonar buoy 60, according to a preferred embodiment of the present invention; and, FIG. 7 is an electrical block diagram of the radio-controlled fish locating system 10 according to a preferred embodiment of the present invention.

Referring now to FIG. 6, a bottom view of the watercraft 20, according to the preferred embodiment of the present invention, is disclosed. The system 10 comprises a preferably circular sonar buoy 60 comprised of a type of fathometer similar to other common commercially available fish finding devices which use a type of active sonar to detect various solid objects under the surface of the water such as fish, the floor portion of a body of water, water depth, water temperature, and the like. The sonar buoy 60 generates a sonar signal 65 (see FIG. 7) which is an electrical impulse from an internal transmitter which is converted into a sound wave by an internal transducer and is sent into the water. The sonar signal 65 strikes a solid object such as a fish and is reflected back. This information is then transmitted via the second RF signal 48 thereto the controller 30 and size, composition, and shape of the object as well as the water depth, temperature, and the like are displayed graphically thereon the display screen 34. The sonar buoy 60 is removably attached thereto a threaded deck aperture 23b on an underside of the deck 23a of the watercraft 20, thereby providing a means for replacement if needed and for use without said watercraft 20. Although illustrated here as removably attached thereto a bottom surface of the watercraft 20 it is understood that the system 10 may be introduced with the sonar buoy 60 build thereinto said watercraft 20 removably or otherwise having equal benefit and as such should not be interpreted as a limiting factor of said present system 10.

Figure 7:
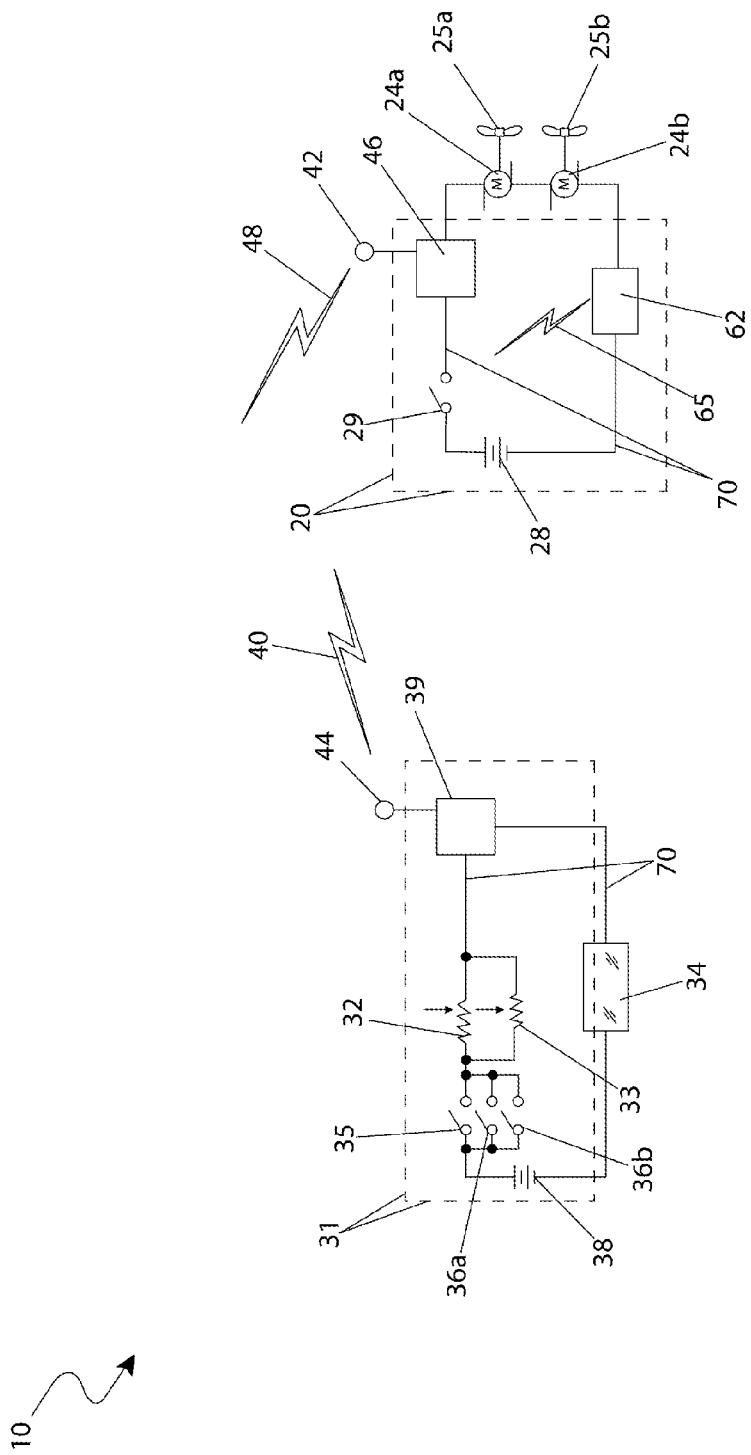

Referring now to FIG. 7, an electrical block diagram of the system 10, according to the preferred embodiment of the present invention, is disclosed. The watercraft 20 comprises an electric circuit which further comprises a current which is generated from the watercraft batteries 28 and carried via insulated conductive electrical wiring 70 thereto the watercraft power switch 29, a watercraft control module 46, the motors 24, and a sonar control module 62. The watercraft power switch 29 comprises two (2) positions, the first is an open or "off" position which disconnects the electric circuit and the second is a closed or "on" position which connects the electric circuit. The watercraft control module 46 comprises a type of central processing unit common to other similar RC vehicles and directs the operation of said watercraft 20 and is in electrical communication therewith the motors 24. The sonar control module 62 comprises a type of central processing unit common to similar active sonar fish finding devices and directs the operation of the sonar buoy 60.

The controller 30 comprises an electric circuit which further comprises a current which is generated from the controller batteries 38 and carried via insulated conductive electrical wiring 70 thereto the controller power switch 35 and pair of menu control buttons 36a, 36b. The controller power switch 35 comprises two (2) positions, the first is an open or "off" position which disconnects the electric circuit and the second is a closed or "on" position which connects the electric circuit. The controller control module 39 directs the operation of the first joystick 32, the second joystick 33, and the display screen 34. The display screen 34 is controlled via manipulation of the pair of menu control buttons 36a, 36b. The first RF signal 40 is generated by the controller control module 39 via input of the first joystick 32 and the second joystick 33 and then transmitted to the watercraft control module 46 via the watercraft antenna 42 which manipulates the location of the watercraft 20 via maneuvering the joysticks 32, 33. The first RF signals 40 determines the speed of each motor 24a, 24b and further each propeller 25a, 25b. Meanwhile, the sonar control module 62 transmits a sonar signal 65 to the watercraft control module 46 to the controller control module 39 which is then further graphically displayed thereon the display screen 34.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be provided as indicated in FIG. 1.

The method of utilizing the system 10 may be achieved by performing the following steps: acquiring the system 10; retrieving the system 10 near a desired body of water; powering on the watercraft 20, thereby engaging the watercraft power switch 29; powering on the controller 30, thereby engaging the controller power switch 35; placing the watercraft 20 on the surface of the water; moving the watercraft 20 over the surface of the body of water via the controller 30 and the first RF signal 40; controlling the forward and backward motion of the watercraft 20 by engaging the first joystick 32 which controls the rotation of the first motor 24a and first propeller 25a; controlling the left and right motion of the watercraft 20 by engaging the second joystick 33 which controls the rotation of the second motor 24b and second propeller 25b; enabling the sonar signal 65 to engage the solid objects under the surface of the water; receiving the second RF signal 48; viewing the graphical representation of an active sonar image thereon the display screen 34; locating a solid object under the surface of the water, such as a fish; approaching the area of the recently located object; fishing as normal; and, benefiting from improved enjoyment, convenience, and time afforded a user of the present system 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A radio-controlled fish locating system for searching solid objects and receiving information on water temperature and depth of a body of water as well as underwater terrain at a bottom surface of the body of water, said radio-controlled fish locating system comprising:
   a watercraft adapted to view the underwater terrain and the solid objects, said watercraft including a watercraft control module, further comprising:
      first and second hulls disposed in a parallel orientation;
      a deck intermediately connected to said first and second hulls;
      a plurality of motors having a plurality of shafts respectively;
      a plurality of propellers connected to said shafts respectively;
      a plurality of propeller covers enclosing said propellers for protecting and directing airflow thereof; and,
      a threaded deck aperture located on an underside of said deck;
   a controller including a controller control module and a display screen connected thereto, said controller control module generates and transmits a first radio-frequency (RF) signal to said watercraft control module for controlling an operation of said watercraft, and a controller electric circuit further comprising:
      a controller battery;
      a controller power switch electrically coupled to said controller battery;
      a plurality of menu control buttons electrically coupled to said controller power switch;
      first and second joysticks electrically coupled to said controller power switch and said controller control module;
      a controller antenna electrically coupled to said controller control module; and,
      a display screen electrically coupled to said controller battery and said controller control module respectively;
   a sonar buoy removably attached to said threaded deck aperture, said sonar buoy generating and transmitting a sonar signal into the water for detecting the solid objects as well as the underwater terrain and water temperature and depth;
   wherein said first RF signal controls a speed of each of said motors and a speed of each of said propellers respectively;
   wherein said watercraft transmits a second RF signal to said controller and thereby provides said controller with information including a size, a composition, and a shape of the solid objects as well as the water depth, temperature and underwater terrain acquired from said sonar signal;
   wherein said controller control module directs operation of said first and second joysticks and said display screen;
   wherein said display screen displays information received from said sonar buoy;
   wherein said controller battery generates a current carried to said controller power switch and said menu control buttons, wherein said display screen is controlled via manipulation of said menu control buttons; and,
   wherein said information is displayed graphically on said display screen.

2. The radio-controlled fish locating system of claim 1, wherein said watercraft further comprises: a watercraft electric circuit comprising:
- a watercraft battery;
- a watercraft power switch electrically coupled to said watercraft battery;
- a watercraft antenna electrically coupled to said watercraft control module for receiving said first RF signal;
- a sonar control module electrically coupled to said watercraft battery and said motors respectively; and,
- wherein said watercraft battery generates and transmits a current to said power switch and said watercraft control module and said motors and said sonar control module respectively.

3. A radio-controlled fish locating system for searching solid objects and receiving information on water temperature and depth of a body of water as well as underwater terrain at a bottom surface of the body of water, said radio-controlled fish locating system comprising:
- a portable watercraft adapted to view the underwater terrain and the solid objects, said watercraft including a watercraft control module, further comprising:
  - first and second hulls disposed in a parallel orientation;
  - a deck intermediately connected to said first and second hulls;
  - a plurality of motors having a plurality of shafts respectively;
  - a plurality of propellers connected to said shafts respectively;
  - a plurality of propeller covers enclosing said propellers for protecting and directing airflow thereof; and,
  - a threaded deck aperture located on an underside of said deck;
- a portable hand-held controller remotely located from said watercraft, said controller including a controller control module and a display screen connected thereto, said controller control module generates and transmits a first radio-frequency (RF) signal to said watercraft control module for controlling an operation of said watercraft, and a controller electric circuit further comprising:
  - a controller battery;
  - a controller power switch electrically coupled to said controller battery;
  - a plurality of menu control buttons electrically coupled to said controller power switch;
  - first and second joysticks electrically coupled to said controller power switch and said controller control module;
  - a controller antenna electrically coupled to said controller control module; and,
  - a display screen electrically coupled to said controller battery and said controller control module respectively;
- a sonar buoy removably attached to said threaded deck aperture, said sonar buoy generating and transmitting a sonar signal into the water for detecting the solid objects as well as the underwater terrain and water temperature and depth;
- wherein said first RF signal controls a speed of each of said motors and a speed of each of said propellers respectively;
- wherein said watercraft transmits a second RF signal to said controller and thereby provides said controller with information including a size, a composition, and a shape of the solid objects as well as the water depth, temperature and underwater terrain acquired from said sonar signal;
- wherein said controller control module directs operation of said first and second joysticks and said display screen; and,
- wherein said display screen displays information received from said sonar buoy;
- wherein said controller battery generates a current carried to said controller power switch and said menu control buttons, wherein said display screen is controlled via manipulation of said menu control buttons; and,
- wherein said information is displayed graphically on said display screen.

4. The radio-controlled fish locating system of claim 3, wherein said watercraft further comprises: a watercraft electric circuit comprising:
- a watercraft battery;
- a watercraft power switch electrically coupled to said watercraft battery;
- a watercraft antenna electrically coupled to said watercraft control module for receiving said first RF signal;
- a sonar control module electrically coupled to said watercraft battery and said motors respectively; and,
- wherein said watercraft battery generates and transmits a current to said power switch and said watercraft control module and said motors and said sonar control module respectively.

5. A method of utilizing a radio-controlled fish locating system for searching solid objects and receiving information on water temperature and depth of a body of water as well as underwater terrain at a bottom surface of the body of water, said method comprising the steps of:
- providing a portable watercraft adapted to view the underwater terrain and the solid objects, said watercraft including a watercraft control module, said watercraft further comprising:
- first and second hulls disposed in a parallel orientation;
- a deck intermediately connected to said first and second hulls;
- a plurality of motors having a plurality of shafts respectively;
- a plurality of propellers connected to said shafts respectively;
- a plurality of propeller covers enclosing said propellers for protecting and directing airflow thereof; and,
- a threaded deck aperture located on an underside of said deck;
- providing and remotely locating a portable hand-held controller from said watercraft, said controller including a controller control module and a display screen each connected thereto and a controller electric circuit further comprising:
- a controller battery;
- a controller power switch electrically coupled to said controller battery;
- a plurality of menu control buttons electrically coupled to said controller power switch;
- first and second joysticks electrically coupled to said controller power switch and said controller control module;
- a controller antenna electrically coupled to said controller control module; and,
- a display screen electrically coupled to said controller battery and said controller control module respectively;
- providing and attaching a sonar buoy to said threaded deck aperture of said watercraft;

said controller control module controlling an operation of said watercraft by generating and transmitting a first radio-frequency (RF) signal to said watercraft control module;

said sonar buoy generating and transmitting a sonar signal into the water for detecting the solid objects as well as the underwater terrain and water temperature and depth;

said watercraft transmitting a second RF signal to said controller and thereby providing said controller with information including a size, a composition, and a shape of the solid objects as well as the water depth, temperature and underwater terrain acquired from said sonar signal; and, graphically displaying said information on said display screen.

\* \* \* \* \*